United States Patent [19]
Page

[11] 3,973,838
[45] Aug. 10, 1976

[54] CONTACT LENSES

[76] Inventor: Louis J. Page, 191-21 Hillside Ave., Hollis, N.Y. 11423

[22] Filed: June 5, 1973

[21] Appl. No.: 367,348

Related U.S. Application Data

[63] Continuation-in-part of Ser. No. 140,200, May 4, 1971, abandoned.

[52] U.S. Cl. .................................. 351/160; 351/161
[51] Int. Cl.² ............................................ G02C 7/04
[58] Field of Search ............................ 351/160–162

[56] References Cited
UNITED STATES PATENTS

| | | | |
|---|---|---|---|
| 2,117,770 | 5/1938 | Row | 351/160 |
| 2,241,415 | 5/1941 | Moulton | 351/162 |
| 2,247,628 | 7/1941 | Beitel | 351/160 |
| 2,393,266 | 1/1946 | Riddell | 351/160 |
| 3,102,157 | 8/1963 | Gamber | 351/160 |
| 3,220,960 | 11/1965 | Wichterle et al. | 351/160 X |
| 3,270,099 | 8/1966 | Camp | 351/161 X |
| 3,454,332 | 7/1969 | Siegel | 351/162 |
| 3,472,581 | 10/1969 | Bronstein | 351/161 |
| 3,488,111 | 1/1970 | Isen | 351/160 |
| 3,489,491 | 1/1970 | Creighton | 351/160 |
| 3,619,044 | 11/1971 | Kamath | 351/160 |

FOREIGN PATENTS OR APPLICATIONS

| | | | |
|---|---|---|---|
| 1,327,193 | 4/1963 | France | 351/160 |
| 701,970 | 1/1941 | Germany | 351/160 |
| 1,045,065 | 10/1966 | United Kingdom | 351/160 |

*Primary Examiner*—David H. Rubin

[57] ABSTRACT

A contact lens comprising at least two components, one of the components is made of a relatively hard optical material, the other component being made of a hydrophilic material and arranged to extend at least partially over the inner surface of the hard component in the form of a peripheral ring, so that a central zone thereon is uncovered and the ring of hydrophilic material, when in a hydrated state, extends rearwardly of the central zone of the hard component, whereby a void is provided between said central zone and the cornea when the lens is placed in position on the cornea, whereby only the hydrophilic component contacts the cornea.

7 Claims, 6 Drawing Figures

CONTACT LENSES

This application is a continuation in part of my patent application Ser.No. 140,200, filed May 4, 1971, entitled CONTACT LENSES, and has an abandoned status.

Contact lenses in general use are made of a hard optical material and have the common fault of being difficult to wear with comfort. Attempts have been made to overcome this disadvantage by making the lens of a hydrophilic material. Lenses made of a hydrophilic material, when in a hydrated state, become soft as a gel and transfer gaseous and liquids therethrough. These lenses have the disadvantage that they do not provide as good a visual acuity as can be obtained with a hard lens since corneal astigmatism is partially transferred through the material to the front surface of the lens. These and other faults and disadvantages necessitate improvement on the type of lenses now being prescribed.

The object of this invention is to overcome these faults and disadvantages by providing a lens having an optical zone made of a relatively hard optical material and the portion of the lens that results on the cornea made of a hydrophilic material, whereby the lens provides the visual acuity of the hard type lens and the comfort of the hydrophilic type lens. Another object is to provide a contact lens which incorporates multifocal visual correction. Another object is to provide a contact lens in which the choice of the material for the hydrophilic component has a greater number of options since this component is not employed for the visual correction in the single vision type lens. Another object is to provide a contact lens of the cosmetic type which will be more comfortable and more natural in appearance. Another object is to provide a lens to be prescribed as a moist bandage in the treatment of dry eyes and other corneal deseases. Another object is to provide a means to re-enforce the hydrophilic type lens. Another object is to provide a means to prevent the lens from rotating relative to the eye. These and other objects and advantages of my invention reside in the novel combination and arrangement of the parts which will be more fully understood from the accompanying drawing and the following description and claims.

Referring to the drawing.

Figure 1:
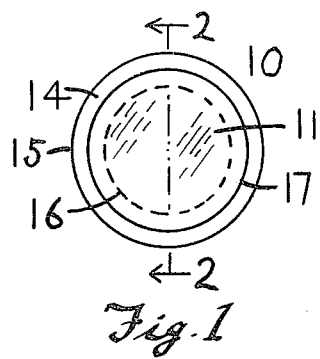
FIG. 1 is a plan view of a lens embodying my invention.
Figure 2:
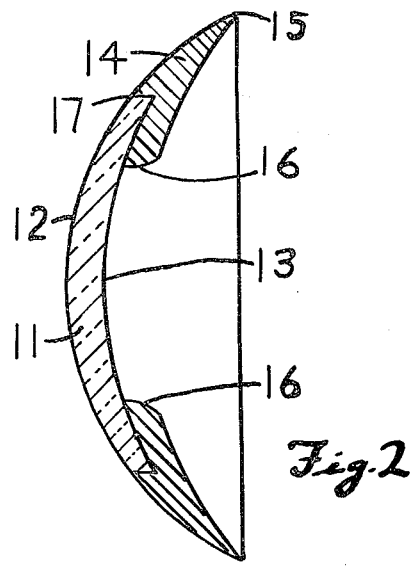
FIG. 2 is an enlarged sectional view taken on line 2—2 of FIG. 1.

Referring to the drawing:

In FIGS. 1 and 2 a contact lens is generally shown at 10 comprising at least two components. One of the components 11 is made of relatively hard optical material and of such a size to at least cover the optical zone of the cornea and having a convex front surface 12 and a concave rear surface 13 which is provided with a radius to suitably fit the cornea. The other component 14 is made of a hydrophilic material and arranged to extend partially over the rear surface 13 of the lens 11 in the form of a peripheral ring. The peripheral edge of the component 14 is shown at 15 and the inner edge at 16. The component 14 in a hydrated state is arranged to extend rearwardly of the rear surface 13 of the lens so that when the lens is placed on the cornea a void is provided between the uncovered rear surface 13 and the cornea so that only the hydrophilic component 14 comes in contact with the cornea. The component 14 is extended over the peripheral edge 17 of the lens and continued therefrom to the peripheral edge 15 of the hydrophilic component 14 as shown in the drawing. The portions of the component 14 which extend beyond the edge 17 of the lens and over the inner surface 13 thereof may be extended therefrom and thereover to any suitable extent relative to the lens 11. The component 14 is attached to the component 11 by any suitable means such as by solvents, thermal etc.

In this form of my invention the lens 10 can be prescribed for errors of refraction encountered in general optometric practice. It can also be used as a moist bandage for the treatment of corneal diseases since the peripheral ring of hydrophilic material allows the transfer of drugs therethrough and the hard component supports the tissue of the cornea. When the lens is placed on the cornea the void between the rear surface of the hard component and the cornea provides a reservoir for the medications. The drugs are placed into the cup of the hard component before placing the lens on the cornea. Another feature of this form of lens is that the hydrophilic component can be made of a formula that is more compatible to the normal function of the tissue of the cornea and more resistant to fungi infiltration since this portion of the lens can be arranged to be out of the line of vision and therefore not pertinent to the prescription of the lens. Another feature of this form of lens is that the portion of the ring 14 can be widened so as to extend the edge 16 toward the center of the lens 11 to a suitable extent and the ring 14 can be provided with either a different radius of curvature or a different index of refraction from that of the component 11 so that the ring 14 provides a lens power different from that of the power of the component 11, whereby a multifocal lens is provided for presbyopic eyes; the central area of the lens being for distant vision and the peripheral ring area for near vision. Another feature is that it provides an improved type of cosmetic lens. The central area being arranged to have the appearance of the pupil of the eye and the area of the hydrophilic component surrounding the pupil and to the rear thereof has the appearance of the iris. Since the hydrophilic component is behind the lens 11, the iris will appear more realistic.

Figure 3:
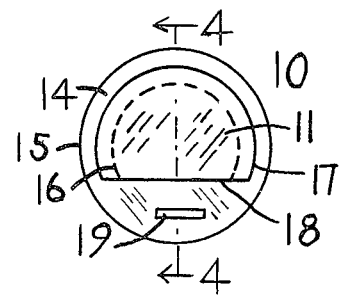
FIG. 3 is a plan view of a modified form of my invention.
Figure 4:
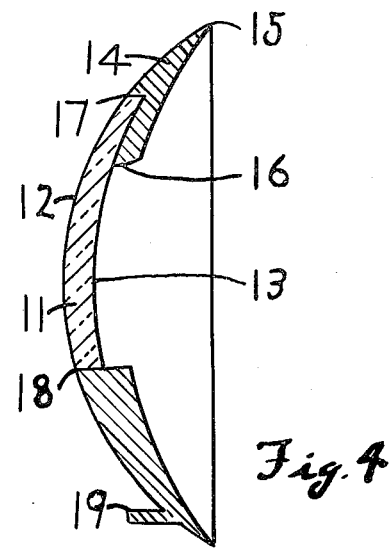
FIG. 4 is an enlarged sectional view taken on line 4—4 of FIG. 3.

In FIGS. 3 and 4 the component 11 is truncated as shown at 18, and the component 14 is arranged as shown in the Figures. In this form the lens 11 is provided with a lens power for distant vision and the portion of the hydrophilic component 14 below the truncated edge 18 of the lens 11 forms a relatively flat top segment which is provided with a lens power or a graduated lens power for a nearer range of vision, thereby providing a multifocal lens. A ledge 19 is provided extending from the lower portion of the component 14 as shown in FIGS. 3 and 4. The ledge 19 is arranged to rest on and along the edge of the lower eyelid when the lens is worn so that the lens is prevented from rotating relative to the eye and when the eyes are lowered relative to the lower eyelid, the lower eyelid raises the lens relative to the eye, thereby positioning the near vision area of the lens in a suitable position for near viewing. The ledge 19 may be made of a relatively firmer material from that of the hydrophilic component and attached thereto by any suitable means, whereby the ledge 19 would serve to re-enforce that portion of the hydrophilic component attached thereto. The ledge 19 can be made a part of a hydrophilic lens whereby it will assist in maintaining the desired curvature of the surfaces.

Figure 5:
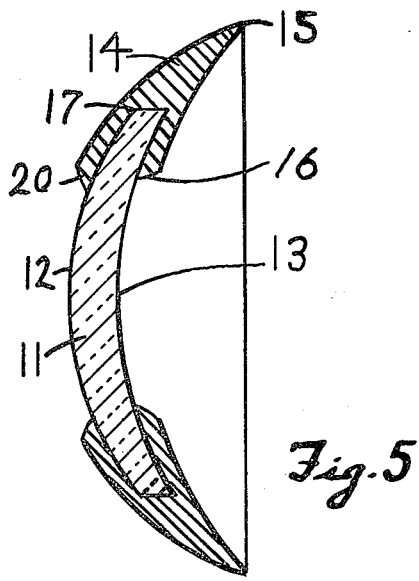
FIG. 5 is an enlarged sectional view of another modification showing the hydrophilic component partially overlying both surfaces of the hard component.

In FIG. 5 is shown a modified form of the invention. In this form the hydrophilic component 14 is extended over the front surface of the lens 11 as shown at 20 in FIG. 5. In all other respects it is similar to the lens 11 shown in FIGS. 1 and 2.

Figure 6:
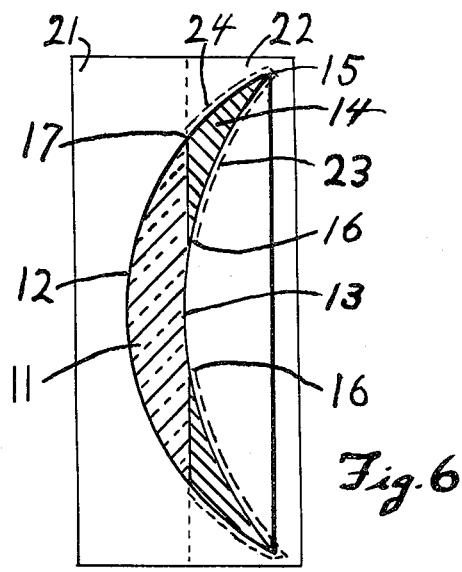
FIG. 6 is an enlarged sectional view of another modification showing a process of lathe cutting the lens from a laminate of the two components.

In FIG. 6 is shown a method or process of cutting the lens from a laminated slab of the two components as shown at 21 and 22. The front surface 12 of the lens is cut on a lathe or other means and provided with the specified radius and to a depth providing the desired diameter of the hard component 11 and the desired overhang of the hydrophilic component 14 as shown in FIG. 6. The rear surface 13 is cut to a depth and radius predetermined as shown in the drawing in FIG. 6 so that the central zone of the component 11 is exposed at the rear as shown at 13. In this form the surfaces of the two components in contact with each other are arranged at a bias or angle to each other providing a joint of relatively greater strength. The portions of the hydrophilic component 14 between the points 15 and 16 swell when in a hydrated state as shown by the dash lines 23 and 24 in the Figure and in such a state extend rearwardly of the rear surface 13 of the lens so that the central area of the component 11 between the points 16—16 of the component 14 is spaced from the cornea when the lens is placed thereon, whereby only the hydrophilic component 14 is in contact therewith. The central area of the component 11 between the points 16—16 may be cut deeper than the surrounding area of the hydrophilic component 14 to provide a greater clearance with the cornea for certain prescriptions such as for conical corneas.

In all the forms shown the hydrophilic component, if required, may be extended beyond the peripheral edge of the component 11 sufficiently to rest on the scleral portion of the eye or it can be truncated to fit unusual conditions encountered.

From the foregoing it can be seen I have provided a contact lens in accordance with the objects of my invention. In the several views I have shown the preferred embodyments of my invention but do not limit myself to these applications. It is understood that other modifications might be conceived embodying the general principles of this invention.

I claim:

1. A corneal type contact lens having at least two components, one of said components being made of a relatively hard optical material and provided with suitable convex and concave refractive surfaces, the concave surface thereof being arranged to face the cornea of the eye and having a substantially continuous radius of curvature to the peripheral edge thereof, and of such a size to cover the major portion of the cornea, and having the surfaces of the hard component at the peripheral edge portion thereof substantially spaced from each other thereby forming a relatively blunt, thick edge surface which extends from the convex surface to the concave surface, thereby providing one of the supporting surfaces for the following described hydrophilic component, the other of said components being made of a hydrophilic material and arranged to extend partially over at least one of the refractive surfaces of said hard component in the form of a peripheral ring or border and continued over and directly across the edge portion of the hard component to the opposite surface thereof so that the dimensional thickness of the hydrophilic component at the point of attachment to the edge portion of the hard component is relatively greater than the thickness of the edge portion of the hard component when said hydrophilic component is dehydrated, so that said ring rests on the cornea when worn, said hydrophilic component being continued therefrom extending radially and continuously around the edge portion thereof in the form of a skirt, the posterior surface of said hydrophilic ring projecting relatively rearwardly of the concave surface of said hard component when dehydrated, so that the exposed central area of the hard component is spaced at a relatively maximum distance from the surface of the cornea when worn, and the hydrophilic component is hydrated, said hard component being provided with the specified prescription, thereby providing the visual efficiency of the hard type contact lens and the hydrophilic component providing the comfort of the hydrophilic type contact lens.

2. A contact lens as set forth in claim 1, wherein the hydrophilic component extends partially over at least one of the refractive surfaces of the hard component in the form of a skirt or border and having a portion of the hydrophilic component projecting relative to the surface of the hard component when dehydrated, the portion of the surface of the hard component lying within the border of the hydrophilic component and the border of said hydrophilic component providing a means defining a well or chamber, whereby drugs placed into said well when the lens is placed on the eye in a substantially horizontal position will be time released therein since the hydrophilic component allows fluids to seep therethrough when hydrated.

3. A contact lens as set forth in claim 1, wherein the hydrophilic ring is provided with a lens power different from the lens power of the central zone of the hard component so that the central zone thereof is arranged for distant vision and the hydrophilic ring is arranged for near vision, thereby providing a multifocal lens.

4. A contact lens as forth in claim 2, wherein the void between the rear surface of the hard component and the cornea is arranged so that when the lens is placed on the cornea said void provides a reservoir for medications when the lens is prescribed as a moist bandage for the treatment of cornea diseases.

5. A contact lens as set forth in claim 1, wherein the central area of the hard component is arranged having the appearance of the pupil of an eye which is black and the hydrophilic component surrounding the area of the pupil being arranged to have the appearance of the iris of the eye, whereby cosmetic contact lenses are provided to change the appearance of the eyes, the black area of the hard component having the appearance of the pupil of the eye, which is opaque will cover disfigured corneas such as those having scar tissue.

6. A contact lens as set forth in claim 1, wherein the hydrophilic component is soft and stretchable when hydrated, so that said hydrophilic component can be stretched over the edge of the hard component or removed therefrom by the wearer whereby different lenses for different purposes can be interchanged in said hydrophilic component.

7. A corneal type contact lens having at least two components, one of said components being made of a relatively hard optical material and provided with suitable convex and concave refractive surfaces, each having a continuous spherical radius of curvature, the other of said components being made of a hydrophilic material, said hard component having a relatively broad, blunt peripheral edge formation situated substantially within the limits of the cornea, said hydrophilic component being attached to and extending directly across the blunt edge portion of said hard component and arranged to extend along the peripheral edge portion thereof in the form of a skirt, and continued extending partially over at least one of the refractive surfaces sufficiently to provide a relatively substantial wearing surface for resting on the cornea and continued projecting over relative to the opposite refractive surface thereon when hydrated, the dimensional thickness of the hydrophilic component extending directly across the edge portion of the hard component being relatively thicker than the dimensional thickness of the edge portion of said hard component when said hydrophilic component is in a dehydrated state, whereby such an arrangement substantially strengthens the attachment of the hydrophilic component to the hard component, the surfaces of said hydropilic component tapering from the point of attachment to the hard component to the peripheral edge thereon so that the portion of the hydrophilic component extending from said point of attachment becomes relatively more flexible toward the edge portion thereof, whereby said edge portion more readily adjusts to the contour of the cornea.

* * * * *